United States Patent [19]

Lombard

[11] 4,393,715
[45] Jul. 19, 1983

[54] ABSOLUTE PRESSURE PICK-UP, ESPECIALLY FOR MEASURING PRESSURE AT INTAKE IN INTERNAL COMBUSTION ENGINES

[75] Inventor: Claude Lombard, Le Chesnay, France

[73] Assignee: Regie Nationale Des Usines Renault, Boulogne-Billancourt, France

[21] Appl. No.: 256,975

[22] Filed: Apr. 23, 1981

[30] Foreign Application Priority Data

May 7, 1980 [FR] France ................................. 80 10172

[51] Int. Cl.³ ............................................. G01L 9/10
[52] U.S. Cl. ...................................... 73/728; 73/729; 336/30
[58] Field of Search .................. 73/722, 728, 717, 729; 336/30

[56] References Cited

U.S. PATENT DOCUMENTS

| 3,545,267 | 12/1970 | Reid et al. | 73/722 |
| 3,834,239 | 9/1974 | King | 73/722 |
| 4,062,354 | 12/1977 | Taylor et al. | 73/729 |

FOREIGN PATENT DOCUMENTS

2394075 1/1979 France .

Primary Examiner—Donald O. Woodiel
Attorney, Agent, or Firm—Oblon, Fisher, Spivak, McClelland & Maier

[57] ABSTRACT

Disclosed is an absolute pressure pick-up for the intake in an internal combustion engine. The pick-up consists of a screened magnetic circuit equipped with a mobile core placed inside an elastic bellows. A chamber (4) that receives either the pressure to measure or the reference vacuum is around the bellows.

3 Claims, 1 Drawing Figure

ABSOLUTE PRESSURE PICK-UP, ESPECIALLY FOR MEASURING PRESSURE AT INTAKE IN INTERNAL COMBUSTION ENGINES

BACKGROUND OF THE INVENTION

1. Field of the Invention

This invention pertains to an absolute pressure pick-up of the induction or frequency variation type, which enables easy adjusting of parameters acting on the pressure output ratio.

2. Description of the Prior Art

Relative or absolute pressure pick-ups are known through patents or publications including of the French patent application No. 80/06310 "Pressure Pick-up" filed on Mar. 24, 1980 by the applicant.

SUMMARY OF THE INVENTION

This invention has as an object an absolute pressure pick-up, capable of economical construction with well-known techniques that are easy to master and that produce good manufacturing results.

BRIEF DESCRIPTION OF THE DRAWINGS

Various other objects, features and attendant advantages of the present invention will be more fully appreciated as the same becomes better understood from the folloiwng detailed description when considered in connection with the accompanying drawings in which like reference characters designate like or corresponding parts throughout the several views, and wherein.

DETAILED DESCRIPTION OF THE PREFERRED EMBODIMENTS

Figure 1:
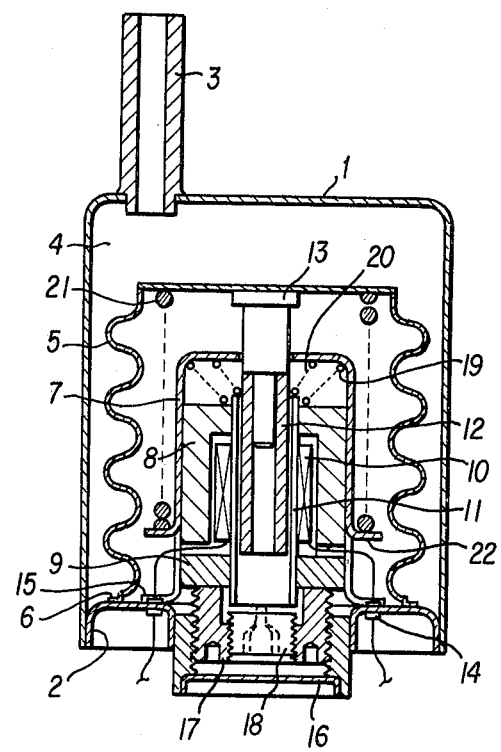
FIG. 1 is an elevational cross-section of the pick-up of the invention.

According to the FIGURE, a watertight outer envelope 1, closed at its lower end by a flange 2, is equipped with a pressure inlet 3 for the chamber 4 delineated by envelope 1, as well as with the flange 2 and a watertight elastic bellows 5 welded to the flange 2 at 6. The inside of the bellows is empty of air.

Inside the bellows 5 is a non-watertight cylindrical casing 7, affixed to the flange 2, and containing a screened magnetic circuit comprised of a ferrite shoulder pipe 8 and a washer 9.

Inside the screened circuit is a conductor coil 10, spooled on a pipe 11, a non magnetic, low conductance material, the coil and pipe being centered inside the screened circuit.

A ferrite mobile core 12 is connected by an intermediate element 13 to the bellows 5 so that the core 12 and bellows move together. The ends of the coil 10 protrude from the watertight structure through glass or ceramic beads 14 and 15.

In the middle of the flange 2, which can be heterogeneous, is an opening that can be obturated by a smaller cup 16 welded after adjustment of the 2 concentric screws 17 and 18 that are in the opening and that respectively set the position of the core 12 in the screened magnetic circuit and the position of the coil 10 in the circuit 8, 9—It is known from French application 80/06310 that adjustment of the screws 17 and 18 makes it possible to adjust the initial induction or frequency on the one hand and the slope of the frequency or induction versus pressure characteristic. Inside the casing 7 are two conical springs 19 and 20 which help position respectively the pipe 11 against the screw 18 and the screened circuit against the screw 17.

A spring 21 leaning on a flange 22 of the casing 7 makes it possible, if need be, to increase the reaction force of the bellows 5 in order to adapt it to higher pressures.

The invention is not simply restricted to a bellows with side flexibility on the cylindrical wall, thereof but includes other equivalent forms and especially those in which flexibility capacity is carried to at least one of the ends of the cylinder.

The operation will now be described briefly: a pressure variation in the chamber 4 makes the length of the bellows 5 vary and therefore makes the position of the core 12 vary in relation to the screened circuit 8, 9, which leads to a variation of induction of coil 10 and therefore, if that coil is connected to a non illustrated oscillator, the frequency of the oscillation.

When the pressure increases in the chamber 4, the induction increases and the frequency decreases.

The described embodiment displays the apparent disadvantage of requiring watertight outputs in 14 and 15, but actually that is an advantage because the coil and the mobile core, placed in a vacuum, are shielded from the impact of dust and corroding media.

In the construction of the pick-up, it is not necessary to perform adjustment under vacuum of the pick-up. It suffices to apply a pressure differential on either side of the bellows 5. For safety reasons, standardizing the pick-up will take place upon obtaining a vacuum, in order to be able to include control of an incorrect vacuum, the welding stress, etc.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pressure pick-up comprising:
   a sealable rigid cylindrical envelope having two ends;
   a fluid tight elastic bellows in said envelope and having one end attached to one of said ends of said envelope;
   biasing means associated with said bellows for expanding said bellows;
   a ferrite screened magnetic circuit in said bellows;
   a mobile ferrite core in said circuit and fixed to the other end of said bellows;
   a single induction coil within said circuit, said coil having two ends extending out of said envelope;
   means for applying a fluid pressure in said envelope and only on the outside of said bellows; and
   means for providing a fluid tight seal for said envelope at points where said two ends exit said envelope.

2. The pick-up of claim 1 wherein said circuit, ferrite core and induction coil are all coaxial with the longitudinal axis of said envelope, and including screw means for adjusting the initial axial position of said coil relative to said circuit.

3. The pick-up of claims 1 or 2 wherein the interior of said bellows is subject to an air pressure less than atmospheric pressure.

* * * * *